Sept. 23, 1941  C. M. DORET  2,256,667

TOOTH STUDY MODEL

Filed July 22, 1939

INVENTOR
CLAIRE M. DORET
BY
ATTORNEY

Patented Sept. 23, 1941

2,256,667

UNITED STATES PATENT OFFICE 2,256,667

TOOTH STUDY MODEL

Claire M. Doret, Los Angeles, Calif.

Application July 22, 1939, Serial No. 285,886

2 Claims. (Cl. 32—71)

This invention relates to a tooth model to be used by dentists and dental surgeons in order to show the patient various tooth disorders and particularly to show the patient how the tooth disorder from which he suffers is to be remedied or cured. The use of such a model will not only greatly enlighten the patient but will also encourage the patient to save the tooth rather than have it removed when the exact ailment is clearly disclosed. Few people realize the relations and positions of the various components of tooth structure and the manner in which the nerves, blood vessels, arteries enter the tooth and the protection afforded them.

Heretofore, no satisfactory means had been available to readily instruct the layman as to the exact nature of the tooth and its various parts which extend into the jaw bone. Now, after viewing this invention, the layman will better understand why his teeth need periodic inspection and attention and thus more willingly seek the services of his dentist before serious harm is done to the tooth structure.

The invention is not only useful for display to the passing public and to patients in a dentist's office, but is also very useful in an instructive sense in dental laboratories and schools.

An object of this invention is to provide a tooth model which can be separated to show the internal structure of the tooth and its environs.

Another object is to provide a tooth model in which the more common ailments are illustrated so that they can be easily seen.

Other objects, advantages and features of my invention will appear from the accompanying drawing, the subjoined detailed description, the preamble of these specifications and the appended claims.

Applicant is about to illustrate and describe one of the forms of her invention in order to teach one how to make, use and vend the same, but it is to be understood that the drawing and description thereof are not to limit the invention in any sense whatsoever, except as limited by the appended claims.

Figure 1:
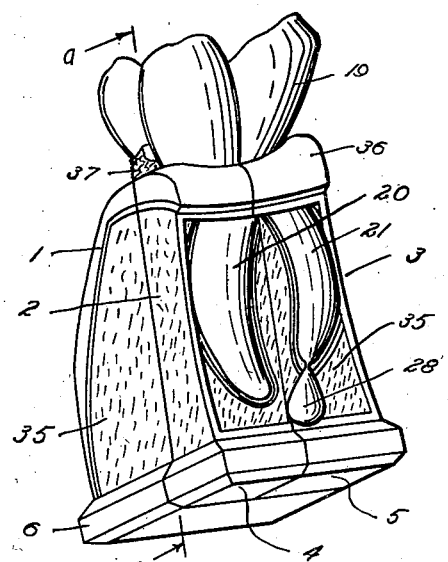
Fig. 1 shows a perspective view of the invention.
Figure 2:
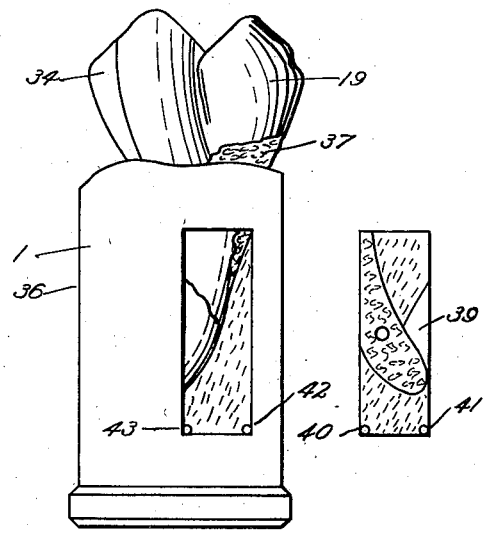
Fig. 2 shows a rear elevational view with a panel thereof removed.
Figures 3, 4:
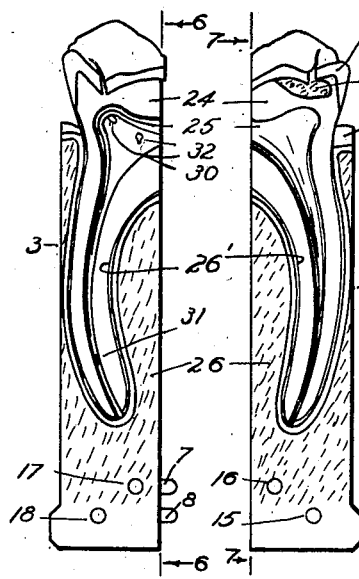
Figs. 3 and 4 show an elevational view of an internal portion of the invention taken substantially along line a—a of Fig. 1, looking in the direction of the arrows.
Figure 5:
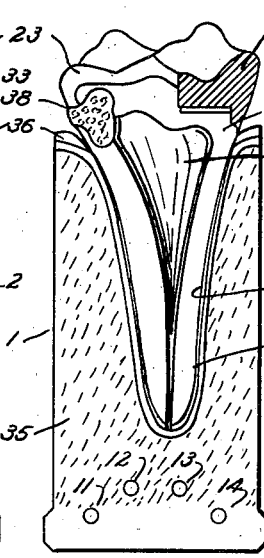
Fig. 5 shows an elevational view of still another internal portion taken substantially along the line a—a of Fig 1, looking in the opposite direction of the arrows.
Figures 6, 7:
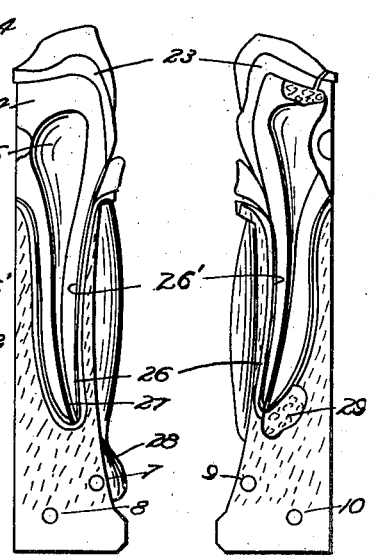
Fig. 6 shows an elevational view taken substantially along the line 6—6 of Fig. 3.
Fig. 7 is an elevational view taken substantially along the line 7—7 of Fig. 4.

The tooth model is divided into three sections indicated by the numerals 1, 2 and 3. Section 1 constitutes a half-sized part, while sections 2 and 3 being quarter parts, considering the model as a whole as the unit sum of all of the parts 1, 2, 3. The sections 2 and 3 have flat bases 4 and 5 respectively and the section 1 has a flat base 6 so that when the model is assembled, the bases 4, 5 and 6 support all sections in neat alignment. The sections 2 and 3 are held together by frictional pins or dowels 7 and 8, fixed to section 3, which snugly fit holes 9 and 10 respectively in the section 2. Upon the lower portion of section 1 are dowel pins 11, 12, 13 and 14 which snugly fit into holes or bores 15, 16, 17 and 18 respectively of sections 2 and 3.

Although the invention may be applied to an incisor or bicuspid tooth, the drawing shows a molar tooth 19 having the roots 20, 21 and 22, all of which are divided as shown to form the sections 1, 2 and 3. The tooth enamel is indicated by 23, the dentine by 24, pulp by 25 and cementum about the lower part of the tooth by 26, and the peridental membrane by 26'. The cord of nerves, blood vessels and arteries is shown at 27.

Pus pockets are indicated at 28 and 29, pulp stones at 30, 31 and 32, a decayed cavity and fissure at 33, and a gold filling at 34. The jaw bone is indicated by the numeral 35 and the gums by 36.

A case of pyorrhea is shown at 37, from which started the decay shown in the cavity 38. In order to completely show the ravishment of this disease, a removable panel 39 is provided to expose one of the roots of the tooth and show its condition. The panel is provided with dowel pins 40 and 41 which snugly fit the bores 42 and 43 respectively for holding the panel frictionally in place.

The model further shows reddened inflammation around the pus pockets and the bone tissues about the area where pyorrhea is in action. All this exposition is of real instructive value and should be of inestimable value to the dental profession.

It is preferred to form the model from a plastic which can be readily molded into shape. Any of the well known friable and plastic materials, such as plaster of Paris, clays, cellulose compounds and the like or derivatives of them, would be satisfactory material from which to make the models. Even rubber or metal may be used, aluminum especially being adapted for such a purpose. Metallic reenforcements may be inserted in the model at proper places to give additional strength to the materials when they are of a very friable nature; reenforcement is especially desirable when the material is to be cut, as by a scalpel, for any demonstrable purpose.

The various parts of the tooth, gums and bones are given their natural color. This is also true as regards the various ailments and the repairs made by the dentist. The coloring of the parts in their natural tints is very desirable in order to thoroughly impress the patients and students and obtain their full attention.

The size of the model will depend upon its particular use. For lecture courses in classrooms and the like, the model would obviously be quite large, in dental offices where the patients would handle the model, it should be only a few times larger than the size of the natural human tooth.

Having thus described my invention, what is claimed as new and desired to be secured by Letters Patent is:

1. An article of manufacture comprising a unit including an enlarged artificial tooth in combination with an enlarged artificial portion of a jaw, said unit having a plurality of vertically arranged detachable parts, cooperating means between the parts for frictionally holding them together, one or more of said parts having eroded sections to indicate tooth disorders, said unit consisting substantially of two quarter parts abutting a half sized part.

2. The article recited in claim 1 wherein the half sized part is provided with a recess showing an internal structural portion of the jaw, and a removable panel frictionally held to the part, all for the purposes described.

CLAIRE M. DORET.